United States Patent Office 2,712,439
Patented July 5, 1955

2,712,439

ELECTRICALLY DRIVEN MACHINES FOR MIXING AND KNEADING OR FOR MINCING

Harold Thomas Lamb, Newcastle upon Tyne, England

Application October 4, 1950, Serial No. 188,367

2 Claims. (Cl. 259—85)

This invention relates to machines for mixing, kneading, mincing and similar culinary purposes, the machines being particularly suitable for mixing the ingredients of cakes, puddings, and the like, kneading dough, and for mincing meat, and other foodstuffs either domestically or in catering establishments or the like, such machines being of the kind comprising a hollow stand or housing, a mixing bowl located above said stand, inside the stand a power unit, e. g. an electric motor, and drive transmission means (including reduction gearing and a vertical output shaft) for rotating the said mixing bowl, and a rotatable mixing and/or kneading member normally located within the said bowl and carried by an arm supported on a post on the said stand or housing, the said rotatable mixing and/or kneading member being driven by engagement with the said bowl. The invention also particularly concerns machines of this kind in which, when it is desired to use the machine for mincing, a mincing attachment is substituted for the said mixing bowl, the machine being tilted into a modified position in which it is supported on one of its ends.

The object of the invention is to provide a form of construction wherein the motor drive assembly for the bowl may be readily detached as a unit from the stand for inspection, cleaning or other purpose.

According to the invention the entire driving mechanism is mounted on a base plate to which is adapted to be secured the stand or housing so as to envelope the driving mechanism.

According to one form of the invention, the reduction gear is additionally housed in a casing secured to the base plate, so that when the base plate is removed the reduction gear is still entirely enclosed save for apertures for the input and output shafts.

The invention will now be described by way of example with reference to the accompanying drawings which shows a machine in which the reduction gear is housed in a casing constituted by the base plate and a separate cover plate.

Figure 1:
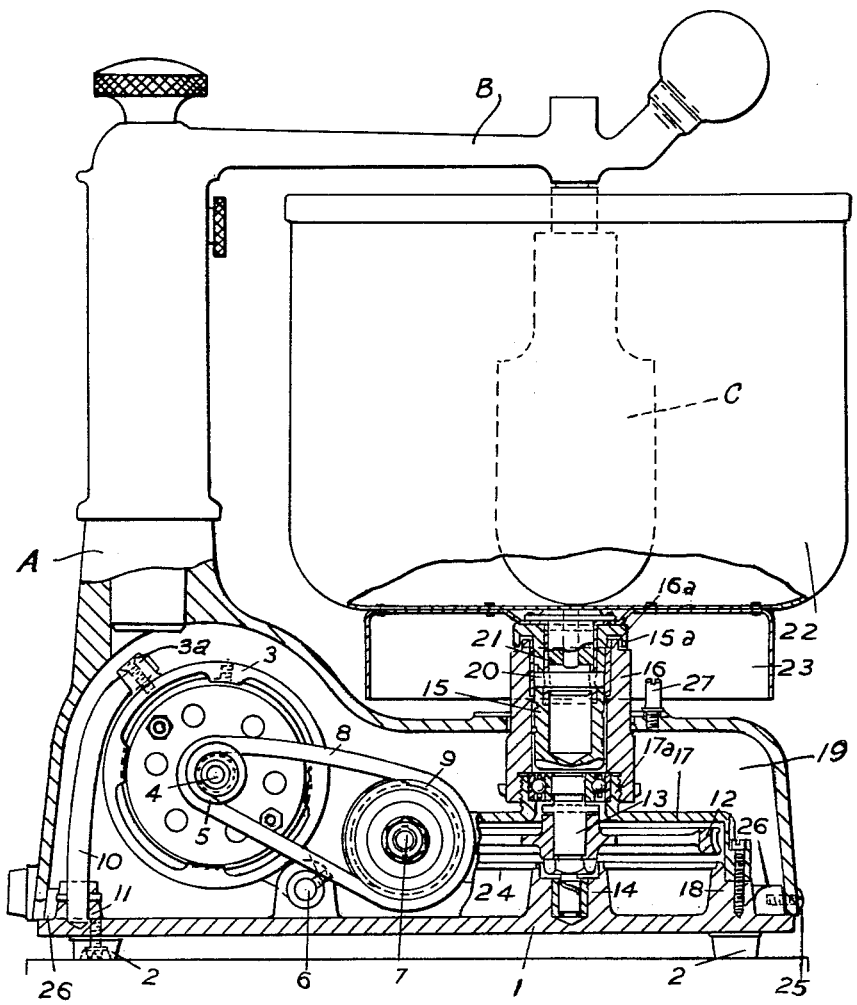
Fig. 1 is a sectional elevation.
Figure 2:
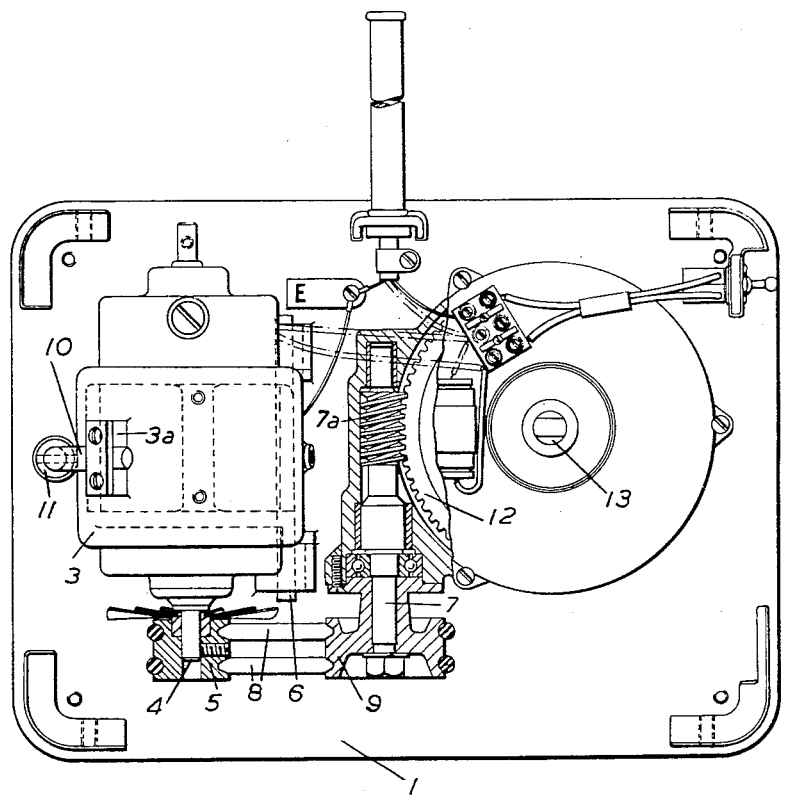
Fig. 2 is a plan of Fig. 1 with the housing removed.

Referring more particularly to the drawings, 1 is a rectangular base plate provided on its underside with rubber or like feet 2 disposed one at or near each corner thereof. On base plate 1 is a housing 19 having a vertical pillar A on which is pivotally mounted a horizontal swinging arm B carrying on its outer end a mixing or kneading member C depending vertically downwards therefrom.

The said base plate carries all the driving mechanism of the machine and thus has mounted on its upper surface near one edge thereof an electric motor 3, the shaft 4 of which is parallel to the rear edge of the base plate 1 and is provided with a pulley 5 at one end. The motor 3 is pivotally mounted about a pivot 6 offset from the vertical axial plane of the motor and located between the motor shaft 4 and the input shaft 7 of the reduction gear and mounted alongside the motor 3, so that the motor tends to fall away from the latter, it being suspended by means of a driving belt 8 which passes over the motor belt pulley and a belt pulley 9 on the input shaft 7 of the reduction gear. A rubber strap 10 anchored at one end to a lug 11 adjacent the rear edge of base plate 1 and at the other end to a lug 3a diametrically opposite the pivot 6 is under tension to constrain the motor against too free pivotal movement. The effect of this arrangement is to allow of automatic slackening of the grip of the belt in the event of the torque on the transmission becoming abnormal, so that the belt may stop easily. This arrangement is according to known practice.

The reduction gear unit is of the worm and worm wheel type and has its input shaft 7 disposed with its axis parallel to the plane of the upper surface of the base plate 1 and also parallel to the axis of the motor shaft 4. The shaft 7 carries a worm 7a which meshes with a worm wheel 12 mounted on a shaft 13 which in its turn is mounted in a bearing in a vertical boss 14 on the inner face of the plate 1. The upper end of the shaft 13 terminates in a socket 15 which is supported laterally in a sleeve 16 screwed onto a central threaded boss 17a on a dished cover plate 17 detachably secured over a circular dished portion 18 formed integral with the plate 1 and concentric with the boss 14, the sleeve 16 projecting through an opening in the hollow stand or housing 19. The upper end of the sleeve 16 is reduced in diameter at 16a to receive a shroud portion 15a formed at the upper end of the socket 15.

A transverse pin 20 located in the socket 15 serves to transmit the drive from the socket 15 to a slotted spigot 21 secured to the underside of the bowl 22. An inverted cylindrical dish 23 is secured to the underside of the bowl to provide an even base for the bowl when seating on a flat surface, the depth of the dish 23 being a little greater than the length of the spigot 21 so that the brim of the dish extends beyond the lower end of the spigot.

When mincing has to be effected the bowl 22 is removed and a mincing attachment clamped on the sleeve 16 on which it is located by means of a slot in its casing engaging a pin 20, while its mincing shaft is slotted to engage the pin 27.

The boss 14 and dish portion 18 are recessed to receive an annular cover 24 to limit the volume of lubricant required for the reduction gear and to ensure its circulation.

The whole of the reduction gear unit is enveloped by the housing 19 which is secured to the base plate 1 by screws 25 engaging threaded lugs 26.

With this construction, when the driving mechanism has to be inspected or cleaned, it is only necessary to remove the bowl or mincer attachment from the sleeve 16, remove the screws 25, and lift off the housing 19 from the base plate 1. The whole of the driving gear will then be completely accessible. If it is desired to inspect the worm reduction gear, this may be effected by removing the screws 26, and lifting off the cover 17, and with it the worm wheel 12 and shaft 13 and associated parts.

I claim:

1. A machine for mixing, kneading, mincing and similar culinary purposes of the kind referred to, comprising a housing, vertical pillar means rigid with said housing, a horizontal swinging arm pivotally mounted on said pillar means, a mixing member depending vertically downwards from the free end of said swing arm, a base plate, driving mechanisms mounted on said base plate, said driving mechanism including a vertical driven shaft independent of said housing a mixing bowl mounted on said shaft, said mixing member being located inside said bowl, and driven by said bowl, said housing being positioned over said driving mechanism and detachably secured at its lower edge to said base plate, said housing having an opening in its upper portion for passing with clearance over said vertical shaft.

2. A machine according to claim 1, wherein the driving mechanism includes a reduction gear, a hollow casing member formed integral with the base plate, said reduction gear being located in said casing member, and a cover plate secured over said casing member to house said reduction gear between itself and said casing member, so that when said base plate is removed said reduction gear is still enclosed.

References Cited in the file of this patent

UNITED STATES PATENTS

| | | |
|---|---|---|
| 1,252,758 | Williams | Jan. 8, 1918 |
| 1,317,365 | Greenberg | Sept. 30, 1919 |
| 1,457,910 | Loichat | June 5, 1923 |
| 1,787,724 | Fedler | Jan. 6, 1931 |
| 1,982,776 | Woerner | Dec. 4, 1934 |
| 2,053,158 | McCabe | Sept. 1, 1936 |
| 2,278,216 | Rich | Mar. 31, 1942 |
| 2,410,217 | Just | Oct. 29, 1946 |
| 2,502,564 | Hansson | Apr. 4, 1950 |
| 2,581,123 | Merkle | Jan. 1, 1952 |

FOREIGN PATENTS

| | | |
|---|---|---|
| 546,318 | Great Britain | July 7, 1942 |
| 625,842 | Great Britain | July 5, 1945 |